Jan. 13, 1970  S. I. ANDERSSON  3,489,331
CONTAINERS
Filed March 13, 1967  6 Sheets-Sheet 1
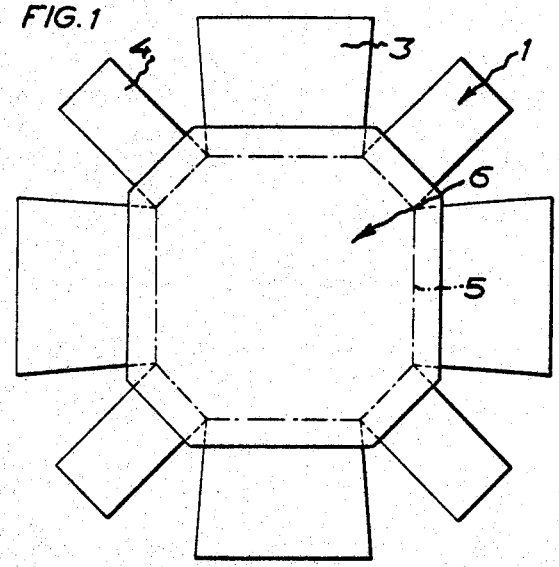
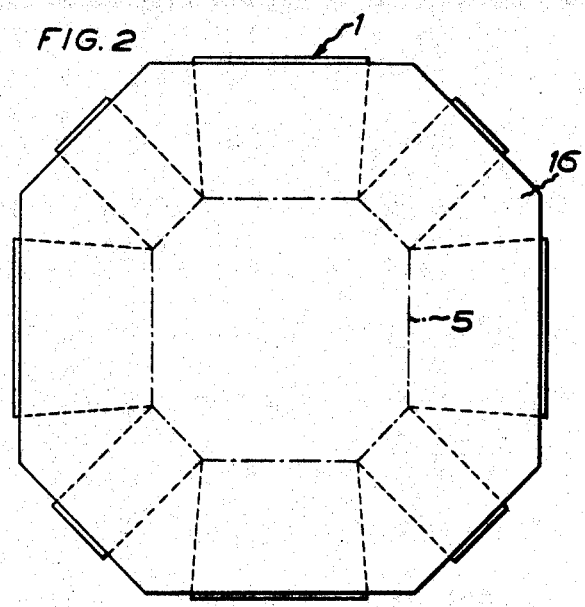
INVENTOR.
SVEN INGEMAR ANDERSSON

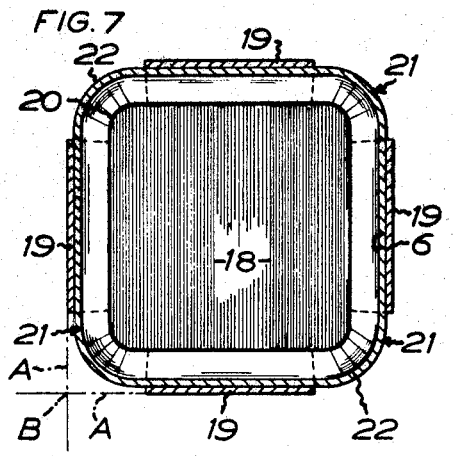
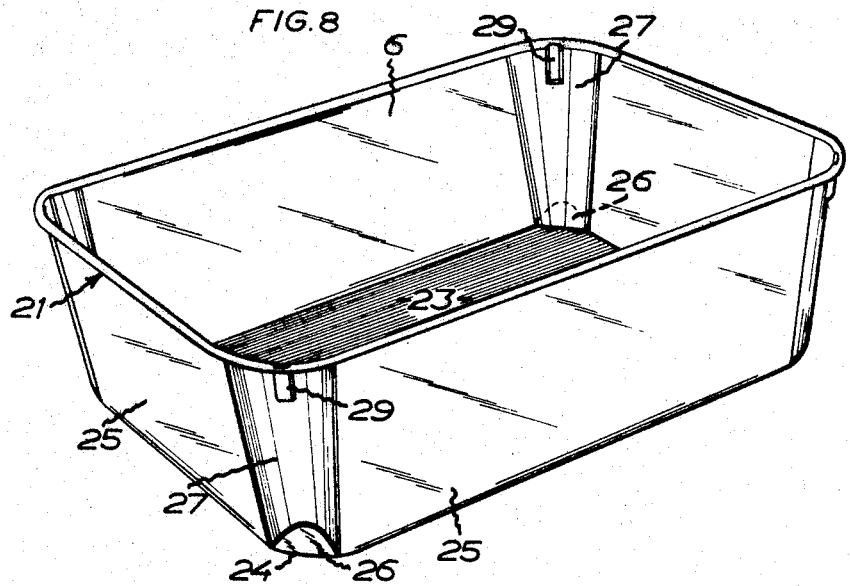

Jan. 13, 1970  S. I. ANDERSSON  3,489,331

CONTAINERS

Filed March 13, 1967  6 Sheets-Sheet 5

United States Patent Office 3,489,331
Patented Jan. 13, 1970

3,489,331
CONTAINERS
Sven Ingemar Andersson, Ystad, Sweden, assignor to A.-B. Akerlund & Rausing, Lund, Sweden, a Swedish joint-stock company
Filed Mar. 13, 1967, Ser. No. 622,766
Claims priority, application Sweden, Mar. 21, 1966, 3,694/66; Mar. 8, 1967, 3,169/67
Int. Cl. B65d 5/40, 5/24
U.S. Cl. 229—14                                9 Claims

ABSTRACT OF THE DISCLOSURE

A container for packaging purposes having an internal protective layer which is united with the container at the erection thereof and in the erected state of the container freely extends between the adjacent but slightly spaced side wall edges of the container.

---

This invention relates to a container having a bottom, a number of side walls that are adjacent in the corner regions and make an angle with said bottom and with each other, and an inner protective layer.

It is previously known to deep-draw containers, for example for packaging purposes, or cups from thermoplastic sheet material. It is also known to provide a preformed container or cup with a protective layer that is united with the container. For economical and practical reasons it has not been possible to provide containers of this type with suitable decorative and/or informative print.

In accordance with the invention, the corner regions are formed by the inner protective layer which extends from side wall to side wall and which in said corner regions keeps the container side walls together which in said regions substantially lie in adjacent edge-to-edge relationship. By this arrangement the panels of a carton blank which are to form the container side walls can be provided with the desired simple or complicated print prior to the erection of the container. Due to the absence of glue flaps the container is readily erected.

The above and further features of the invention will become apparent from the following description in which reference is made to the accompanying drawings.

In the drawings:

FIGURE 1 is a developed plan view of a carton blank and a protective sheet for a container, with the protective sheet placed on top of the carton blank;

FIGURE 2 is a developed plan view of another carton blank and protective sheet, with said sheet placed on top of the carton blank;

FIGURE 7 is a section of a container made from the carton blank in FIGURE 5 and a protective sheet;

FIGURE 8 is a perspective view of a container made from the carton blank in FIGURE 6 and a protective sheet;

In FIGURE 1 of the drawings is shown a conventionally punched coplanar blank 1 of carton having panels which in the finished container are to form the bottom 2 and side walls 3, 4 thereof. The side walls 3, 4 are hinged to the bottom 2 by means of crease lines 5. FIGURE 1 also shows a protective sheet 6 which is loosely placed on top of the blank 1, said blank 1 and said protective sheet 6 being shown in the relative positions they will broadly occupy when they have been brought together to form said container but before the latter is erected into finished state and the protective sheet 6 is united with the container to form a protective layer within it. The protective sheet 6 is of tensile, preferably thermoplastic material which can be brought to adhere to the blank 1 by application of heat, in which case the protective sheet 6 is pressure-sensitive. However, to ensure a satisfactory connection between the carton blank 1 and the protective sheet 6 either the carton blank or the protective sheet is provided with a thermoplastic binder on the face to be united with the protective sheet and the carton blank 1, respectively. In FIGURE 1, the said face is the upwardly facing surface of the blank 1. The thermoplastic binder can be caused to connect the blank 1 and the protective sheet 6 intimately together, by application of heat.

Figure 3:
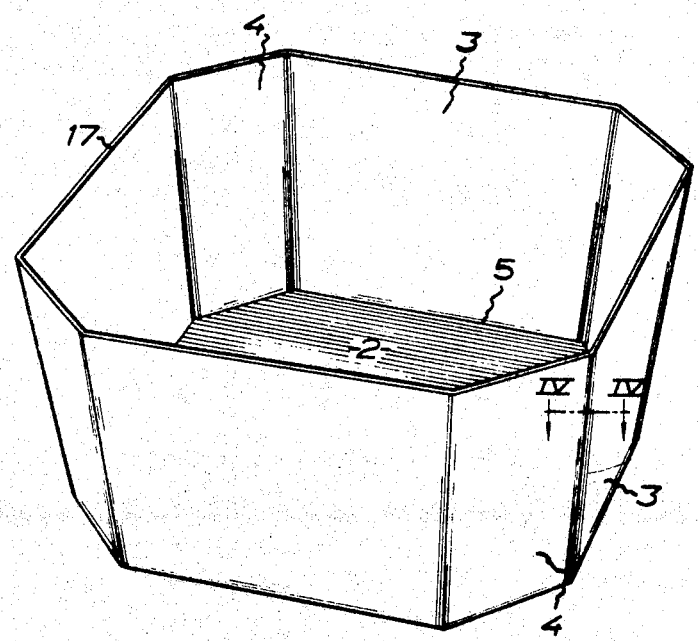
FIGURE 3 is a protective view of a container made from the blank and sheet in FIGURE 1.
Figure 4:
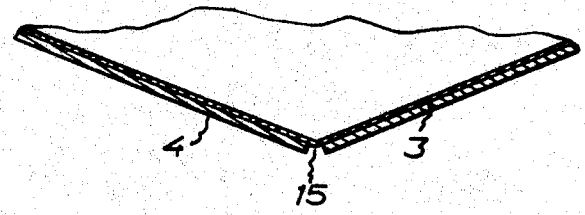
FIGURE 4 is a section on line IV–IV in FIGURE 3.
Figure 12:
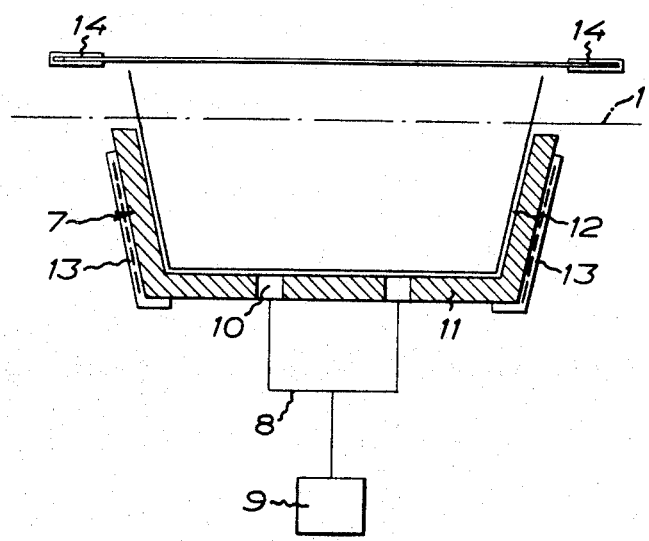
FIGURE 12 is a diagrammatic exemplifying view of a mould used for erecting the container.

Punching of the blank 1 is carried out in the conventional manner so that the side walls 3, 4 in the finished container formed from the erected blank will substantially be in adjacent edge-to-edge relationship. After the punching operation the blank 1 is brought together with the protective sheet 6, as is shown in FIGURE 1, whereupon the two blanks 1, 6 are placed on the mould 7 in FIGURE 12 which is connected over pipes 8 to a vacuum source 9. The pipes 8 are connected with the mould cavity 12 via holes 10 in the bottom 11 of the mould 7. Mounted at the outer side of the mould 7 are electric heating elements 13 by which the mould 7 can be heated to a temperature suitable to plasticize the thermoplastic binder on the blank 1 or the protective sheet 6. The mould 7 also has clamping means 14 with the aid which the sheet 6 is clamped when said sheet 6 and the blank 1 are placed on the mould 7. The connection between the mould cavity 12 and the vacuum source 9 permits sucking the blank 1 into said cavity 12 at the same time as the protective sheet 6 is sucked into the blank 1 being erected or already erected. The time sequence may be chosen in such a way that the blank 1 is first erected and slightly heated, or is mechanically forced a distance into the mould before the protective sheet 6 is sucked into, stretched and glued in the thus-erected container by means of the layer of binder heated by the mould so that it is plasticized or made tacky. After withdrawal from the mould 7 the container has the appearance shown in FIGURE 3. In addition to serving as a protection for the container content, the protective sheet 6 will keep the container and the side walls 3 and 4 thereof together, fixing the container in the erected position. In the erected container the protective sheet 6 covers the gaps 15 (FIGURE 4) between the side walls 3 and 4 which are substantially in adjacent edge-to-edge relationship. Of course, the protective sheet 6 also extends continuously and uninterruptedly over the areas formed by the crease lines 5 between the bottom 2 and the side walls 3, 4 of the container. It is also possible to use air under pressure to urge both the blank 1 and the protective sheet 6 into the mould cavity 12.

A protective sheet 16 approximately of the same size as the blank 1 is shown in FIGURE 2. Such coincident size is preferably chosen when the blank 1 and the protective sheet 16 are sucked and/or forced into the mould 7 at one and the same time, whereby some portions of the protective sheet are stretched close to the bottom 2 of the container, while other portions of said sheet are contracted in proximity of the container rim 17.

Figure 5:
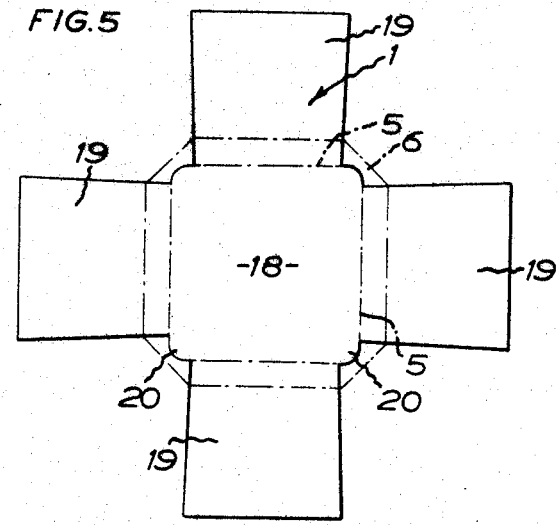
FIGURE 5 is a developed plan view of a modified carton blank.

In the modification shown in FIGURE 5 the carton blank 1 has a panel which is to form the bottom 18 of the container, and a number of panels which are to form the side walls 19 of the container. The bottom 18 has free arcuate marginal regions 20 extending between the side walls 19. When the blank 1 is erected in a conforming mould (FIGURE 12) with rounded corners, and the protective sheet 6 is drawn and/or forced down into the erected container and caused to adhere thereto, those portions 22 of the protective layer in the finished container shown in FIGURE 7 that extend freely in the corner regions between the adjacent side walls 19 and bridge the interstices 21 therebetween will have an arcuate cross section and mutually interconnect the side walls 19. The latter are thus kept together only by their union with the inner protective container layer formed by the protective sheet 6.

In the containers shown in FIGURES 1–4 the protective layer portions in the gaps 15 between the adjacent flat side walls lie at or in immediate proximity of an assumed point of intersection between the main planes of the side walls 3 and 4. In the containers shown in FIGURES 5–10 the protective layer portions 22 bridging the interstices 21 between the side walls 19 are slightly spaced from said point of intersection. For reasons of clarity the main planes A of the side walls are shown merely by dash and dot lines in FIGURE 7, the point of intersection being designated B.

Figure 6:
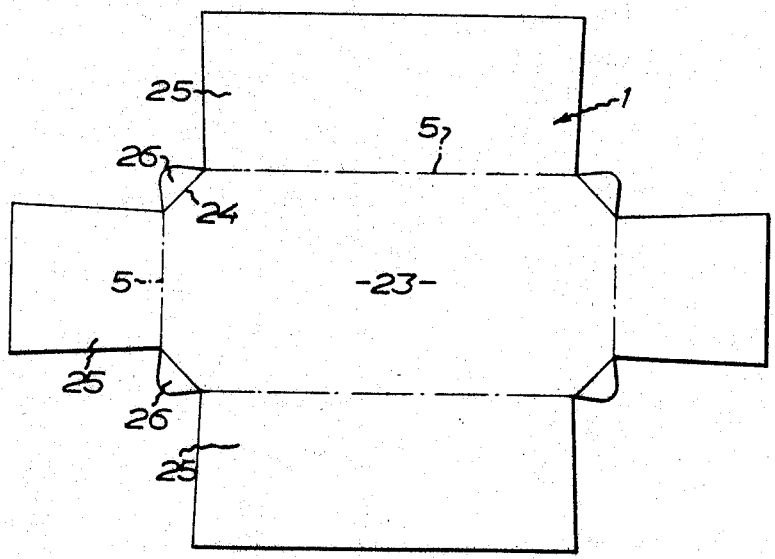
FIGURE 6 is a developed plan view of still another modified carton blank.

In the blank 1 shown in FIGURE 6 tongues 26 are hinged to the free edges 24 of the bottom 23 in the corner regions between the side walls 25 by crease lines coinciding with said edges 24. In the erected container, FIGURE 8, said tongues 26 reach some distance up on the outer sides of, and is connected to, the protective layer portions 27 in the corner regions. Said tongues 26 reinforce the exposed lower parts of the protective sheet portions 27.

Figure 9:
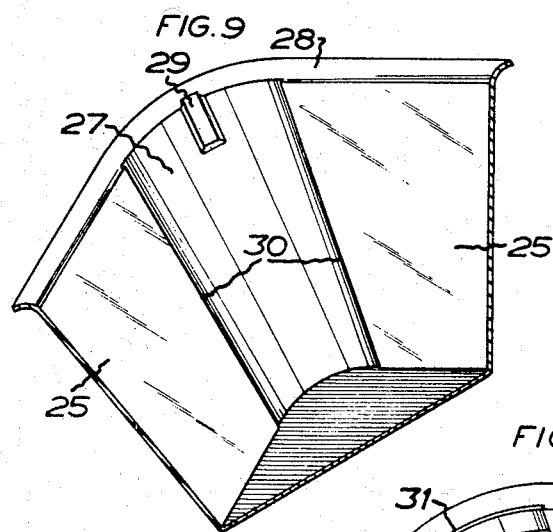
FIGURE 9 is a fragmentary perspective view, as seen from above, of the inner side of a corner of the container in a modified embodiment of said corner.
Figure 10:
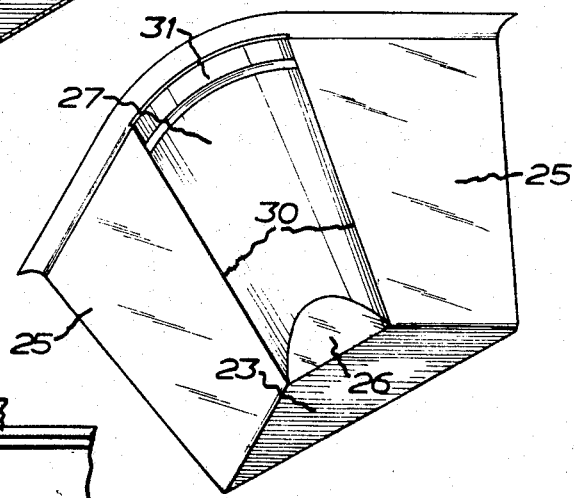
FIGURE 10 is a fragmentary perspective view, as seen from below, of the outer side of a corner of the container in a further modified embodiment of said corner.

To prevent the containers, when kept stored in stacks, from jamming in each other by wedging action the exposed protective layer portions near the rim 28 of the container (FIGURE 9) may be provided with an outwardly directed boss 29 formed at the erection of the container, see FIGURES 8, 9 and 10. In the embodiment shown in FIGURE 9 the boss 29 is disposed at a point between the edges 30 of the adjacent side walls 25. In the embodiment shown in FIGURE 10 the boss 31 extends from the edge 30 of one side wall 25 to the edge 30 of the other side wall 25. The bosses 31 reinforce the protective layer portion 27.

Figure 11:
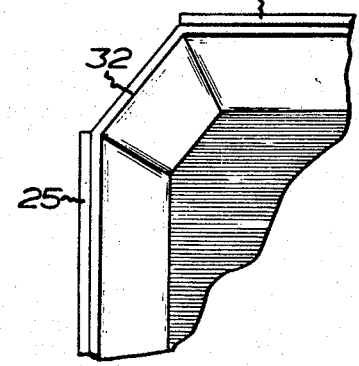
FIGURE 11 is a fragmentary view, as seen from above, of a corner of a modified container.

A straight protective layer portion 32 is shown in FIGURE 11.

Figure 13:
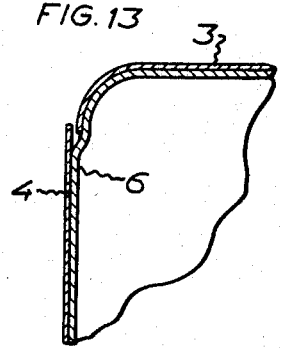
FIGURE 13 is a section of a corner region in a modified container.

In the corner region shown in FIGURE 13 of a modification of the container, one side wall 3 slightly overlaps the edge of the other side wall 4 in the same corner region, the protective layer formed by the sheet 6 keeping together the side walls 3 and 4 which are substantially in adjacent edge-to-edge relationship in said corner region.

What I claim and desire to secure by Letters Patent is:

1. A container having a bottom, a number of side walls that are adjacent in the container corner regions and make an angle with said bottom and with each other, and an inner protective layer, wherein the corner regions are formed by the inner protective layer which extends from side wall to side wall and which in said corner regions keeps the container side walls together which in said regions lie substantially in adjacent edge-to-edge relationship, the respective protective layer portion in the proximity of the rim of the container having an outwardly directed element in the shape of a boss.

2. A container having a bottom, a number of side walls that are adjacent in the container corner regions and make an angle with said bottom and with each other, and an inner protective layer, wherein the corner regions are formed by the inner protective layer which extends from side wall to side wall and which in said corner regions keeps the container side walls together which in said regions lie substantially in adjacent edge-to-edge relationship, and tongues integral with the container bottom and provided in the corner regions extend upwardly at the outer side of, and are united with the protective layer portions in said corner regions.

3. A container comprising a box erected from a unitary blank, said box having a bottom, side walls integral with the bottom and adjacent in the box corner regions, and an inner protective layer of thermoplastic material stretched over the bottom, the side wall and the box corner regions, and united with at least the bottom and the side walls by means of a thermoplastic binder to keep the side walls together, portions of said protective layer in said box corner regions extending freely between adjacent ones of said side walls and spaced from the point of intersection between the main planes of the planar side walls.

4. A container comprising a box erected from a unitary blank, said box having a bottom, side walls integral with the bottom and adjacent in the box corner regions, and an inner protective layer of thermoplastic material stretched over the bottom, the side walls and the box corner regions and united with at least the bottom and the side walls by means of a thermoplastic binder to keep the side walls together, said protective layer portion in proximity of the rim of the container having an outwardly directed element in the shape of a boss.

5. A container as claimed in claim 3, in which the protective layer portions are arcuate in cross section.

6. A container as claimed in claim 3, in which those protective layer portions, which in the corner regions extend freely between adjacent container side walls are straight in cross section.

7. A container as claimed in claim 4, in which the boss-shaped outwardly directed element is located at a point between the adjacent container side walls.

8. A container as claimed in claim 4, in which the boss-shaped outwardly directed element extends substantially from one container side wall to the other container side wall.

9. A container comprising a box erected from a unitary blank, said box having a bottom, side walls integral with the bottom and adjacent in the box corner regions, and an inner protective layer of thermoplastic material stretched over the bottom, the side walls and the box corner regions, and united with at least the bottom and the side walls by means of a thermoplastic binder to keep the side walls together, and tongues integral with said bottom and provided in said corner regions extend upwardly at the outer side of, and are united with said protective layer portions in said corner regions.

References Cited

UNITED STATES PATENTS

| 726,205 | 4/1903 | Tuttle. |
| 2,590,221 | 3/1952 | Stevens. |
| 2,808,192 | 10/1957 | Rasin _____ 229—31 |

DAVID M. BOCKENEK, Primary Examiner

U.S. Cl. X.R.

229—31